(12) United States Patent
Wu et al.

(10) Patent No.: US 9,177,018 B2
(45) Date of Patent: Nov. 3, 2015

(54) CROSS LANGUAGE SEARCH OPTIONS

(71) Applicant: Google Inc., Mountain View, CA (US)

(72) Inventors: Zhuohao Wu, Beijing (CN); Hui Li, Shanghai (CN); Gangjiang Li, Shanghai (CN); Yong Zhang, Shanghai (CN); Guang Hua Li, Shanghai (CN); Boon-Lock Yeo, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/505,758

(22) Filed: Oct. 3, 2014

(65) Prior Publication Data
US 2015/0019582 A1 Jan. 15, 2015

Related U.S. Application Data

(63) Continuation of application No. 13/510,561, filed as application No. PCT/CN2009/001287 on Nov. 20, 2009, now Pat. No. 8,856,162.

(51) Int. Cl.
*G06F 17/30* (2006.01)

(52) U.S. Cl.
CPC ...... *G06F 17/3043* (2013.01); *G06F 17/30247* (2013.01); *G06F 17/30265* (2013.01); *G06F 17/30669* (2013.01)

(58) Field of Classification Search
CPC .............. G06F 17/30023; G06F 17/30047; G06F 17/3005; G06F 17/30244; G06F 17/30634; G06F 17/306577; G06F 17/3066; G06F 17/30669; G06F 17/30696
USPC .................................................. 707/760, 765
See application file for complete search history.

(56) References Cited

U.S. PATENT DOCUMENTS 6,360,196 B1  3/2002 Poznanski et al.
2002/0064316 A1* 5/2002 Takaoka ................... 382/305
(Continued)

FOREIGN PATENT DOCUMENTS

CN 1492354 4/2004
TW 1221234 9/2004
(Continued)

OTHER PUBLICATIONS

Victor Peinado, "FlickLing: a Multilingual Search Interface for Flickr", 2008, Department of Computer Science, Univerisity of Sheffield.*

(Continued)

*Primary Examiner* — Thu-Nguyet Le
(74) *Attorney, Agent, or Firm* — Fish & Richardson P.C.

(57) ABSTRACT

Methods, systems, and apparatus, including computer programs encoded on computer storage media, for cross-language image search. One method includes receiving an image search query and image search results responsive to the image search query. Translations of the image search query into other languages are obtained, and search results responsive to each of the translations are received. Instructions are provided to a client device. The instructions cause the client device to present a user interface that includes one or more of the image search results responsive to the image search query and a cross-language search option for each of the translations. Each cross-language search option includes the translation and a preview of the image search results responsive to the translation.

19 Claims, 6 Drawing Sheets

(56) References Cited

U.S. PATENT DOCUMENTS

| | | |
|---|---|---|
| 2004/0102956 A1 | 5/2004 | Levin |
| 2005/0120311 A1* | 6/2005 | Thrall .......................... 715/811 |
| 2006/0129424 A1 | 6/2006 | Chan |
| 2007/0174790 A1 | 7/2007 | Jing et al. |
| 2009/0024599 A1 | 1/2009 | Tata |
| 2009/0083243 A1 | 3/2009 | Heymans et al. |
| 2012/0233196 A1 | 9/2012 | Wu et al. |

FOREIGN PATENT DOCUMENTS

| | | |
|---|---|---|
| TW | 200809549 | 2/2008 |
| TW | 200813755 | 3/2008 |

OTHER PUBLICATIONS

Search Report issued in Taiwan Application No. 099140094, dated Jan. 23, 2015, 1 page.

Artiles et al., "Are Users Willing to Search Cross-Language? An Experiment with the Flickr Image Sharing Repository," CLEF 2006 Workshop, Sep. 20, 2006.

Clough et al., "Providing Multilingual Access to FLICKR for Arabic Users," Sep. 20, 2006, Evaluation of Multilingual and Multi-Modal Information Retrieval; [Lecture Notes in Computer Science], 205-216.

Clough et al., "User experiments with the Eurovision cross-language image retrieval system," Journal of the American Society for Information Science and Technology, 57(5):697-708, Mar. 1, 2006.

Peinado, "FlickLing: a Multilingual Search Interface for Flickr," 2008, Department of Computer Science, University of Sheffield.

European Search report in EP Application No. 09851357.5, dated Jan. 3, 2014, 7 pages.

International Search Report and Written Opinion in International Application No. PCT/CN2009/001287, mailed Aug. 19, 2010, 12 pages.

* cited by examiner

CROSS LANGUAGE SEARCH OPTIONS

CROSS-REFERENCE TO RELATED APPLICATIONS

This application is a continuation of U.S. application Ser. No. 13/510,561, filed on May 17, 2012, which is a 371 application of PCT/CN2009/001287, filed on Nov. 20, 2009. The disclosures of the prior applications are considered part of and are incorporated by reference in the disclosure of this application.

BACKGROUND

This specification relates to image search.

Internet search engines provide information about Internet accessible resources (e.g., web pages, images, text documents, multimedia content) that are responsive to a user's search query. For example, when a user submits an image search query, i.e., one or more terms that an Internet search engine uses to search images, the Internet search engine can generate a group of image search results responsive to the image search query, and present them to the user. However, for certain queries, translations of the queries in particular languages have better results (e.g., more relevant results, more diverse results, more numerous results, etc.). For example, if the query is the name of a Japanese popular culture icon, search queries in Japanese will likely have better results than search queries in English. Therefore, a user who enters an image search query in a given language for a particular subject may not be presented with as good of image search results as the user would be if he or she had entered the same search query for the particular subject in a different language.

SUMMARY

This specification describes technologies relating to cross-language image search.

In general, one aspect of the subject matter described in this specification can be embodied in methods that include the actions of receiving, at a data processing apparatus, a first image search query and first image search results that are responsive to the first image search query, the first image search query being one or more terms in a first language; obtaining, by the data processing apparatus, translations of the first image search query, wherein each translation is a translation of the first image search query into a respective second language different from the first language; receiving, at the data processing apparatus, for each translation of the first image search query, respective image search results that are determined to be responsive to the translation of the first image search query when the translation is used as an image search query; and providing first instructions to a client device that, when executed by the client device, cause the client device to present a user interface including: one or more of the first image search results responsive to the first image search query; and a respective cross-language search option for each of the translations of the first image search query, the respective cross-language search option for each translation including the translation and a preview of the respective image search results responsive to the translation, wherein each cross-language search result is selectable in the user interface. Other embodiments of this aspect include corresponding systems, apparatus, and computer programs products recorded on computer storage devices, each configured to perform the operations of the methods.

These and other embodiments can each optionally include one or more of the following features. The preview of the respective image search results responsive to a respective translation of the image search query can be an image associated with one of the respective image search results.

The method can further include, in response to a selection of a first cross-language search result, providing second instructions to the client device that, when executed by the client device, cause the client device to present a user interface including a first translation corresponding to first the cross-language search result and the respective image search results that are responsive to the first translation. The second instructions can further include instructions that, when executed by the client device, cause the client device to present the first image search query. The first image search query can be selectable in the user interface. The method can further include, in response to a selection of the first image search query, providing third instructions to the client device that, when executed by the client device, cause the client device to present a user interface including the first image search results.

Obtaining one or more selected translations for the first image search query can include receiving a plurality of candidate translations of the first image search query; determining a score for each candidate translation; and selecting the translations from the candidate translations according to the scores. Determining a score for a candidate translation can include determining the score for the candidate translation from a frequency of submission measurement that measures how often the candidate translation is received from users as an image search query. Determining a score for a candidate translation can include determining the score for the candidate translation from a frequency of revision measurement that measures how often search queries in the first language are revised by users to corresponding search queries in the respective second language of the candidate translation. Determining a score for a candidate translation can include determining the score for the candidate translation from a click through rate for the candidate translation when the candidate translation is submitted as a search query, wherein the click through rate measures how often users select search results responsive to the candidate translation. Determining a score for a candidate translation can include determining the score for the candidate translation from a unique users measurement that estimates a number of unique users that submitted the candidate translation as a search query. Determining a score for a candidate translation comprises determining the score for the candidate translation from a quantity of results measurement that measures a number of image search results responsive to the candidate translation, when the candidate translation is submitted as an image search query.

Particular embodiments of the subject matter described in this specification can be implemented so as to realize one or more of the following advantages. A user can be presented with additional search options that allow the user to identify additional relevant image search results. The additional search options can be in languages that the user is not necessarily familiar with. A user can view a preview of the search results for various search options to estimate how useful each option will be. A user can be presented with other indications of usefulness for each search option, for example, the number of results available with that search option and the name of the language of the search option.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Example Search Environment

Figure 1:
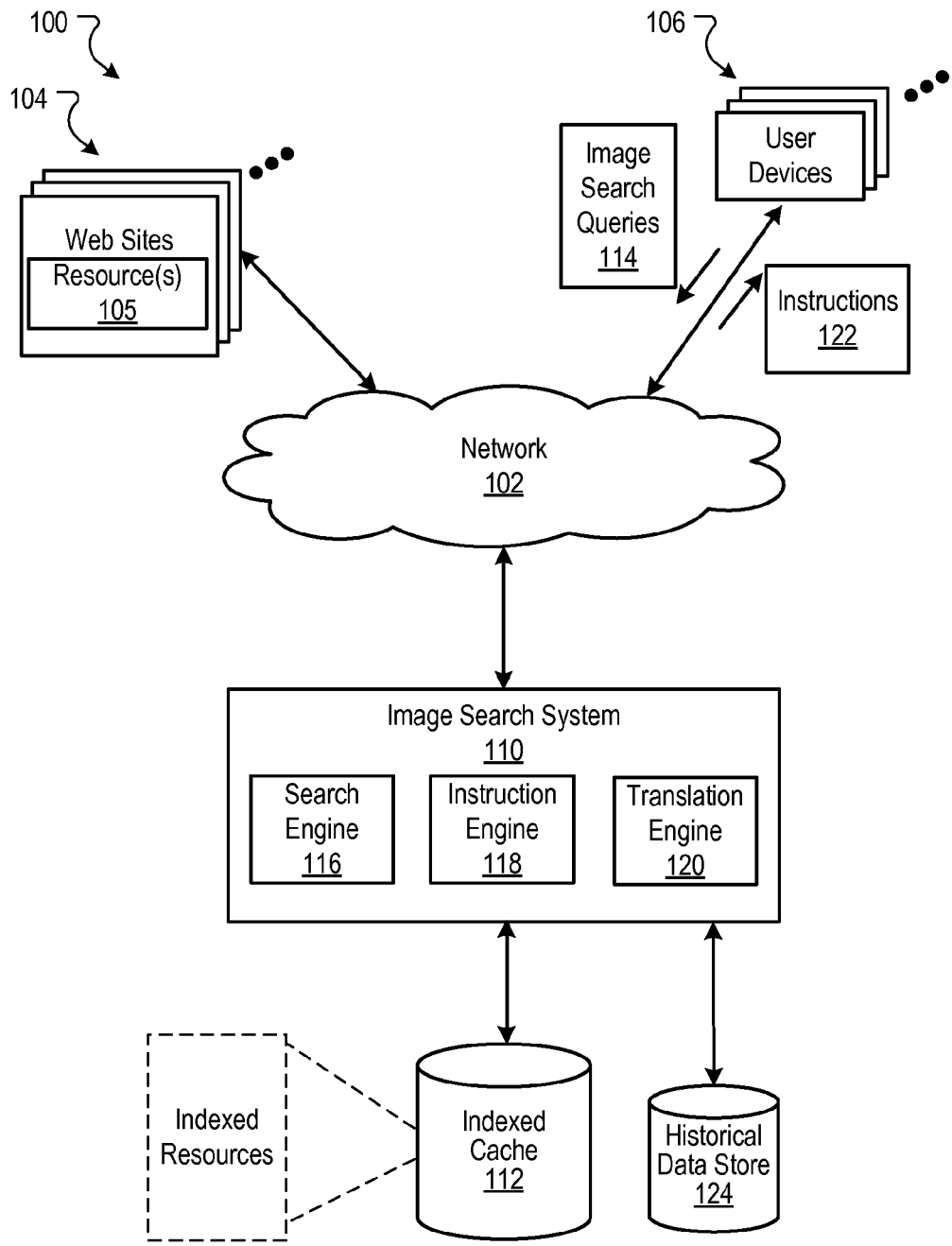
FIG. 1 is a block diagram of an example environment in which an image search system provides image search services.

FIG. 1 is a block diagram of an example environment 100 in which an image search system 110 provides image search services. The example environment 100 includes a network 102, e.g., a local area network (LAN), wide area network (WAN), the Internet, or a combination of them, that connects web sites 104, user devices 106, and the search system 110. The environment 110 may include several web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. The resources can include content, e.g., words, phrases, images and sounds. The resources can also include embedded information (e.g., meta information and hyperlinks) and/or embedded instructions (e.g., JavaScript scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources, a search system identifies the resources by crawling and indexing the resources provided by the web sites 104. Data about the resources can be indexed based on the resource to which the data corresponds. The indexed, and optionally cached, copies of the resources are stored in an indexed cache 112.

The user devices 106 submit image search queries 114, and optionally other search queries, to the image search system 110. The image search system 110 can be a separate search system, or part of a larger search system that searches other types of resources. In response to receiving an image search query 114 from a user device 106, the search system 110 uses its search engine 116 to access the indexed cache 112 and identify image resources that are relevant to the search query. Image resources can include images, video, and other visual content. The search engine 116 generates image search results that identify the image resources. An image search result is data generated by the search engine 116 that identifies an image resource that is responsive to a particular search query, and includes a link to the image resource, or the web site that contains the image resource. An example image search result can include, for example, a thumbnail image of the image resource, a snippet of text, the URL of the web page, and a link to the web page or image resource.

The search engine 116 can rank the image search results based on scores related to the resources identified by the search results, as well as example relevance feedback scores. Scores related to the resources include, for example, information retrieval ("IR") scores and optionally a quality score of each resource relative to other resources. In some implementations, the IR scores are computed from dot products of feature vectors corresponding to a search query 114 and a resource, and the ranking of the search results is based on scores that are a combination of the IR scores and quality scores. For image search results, the relevance feedback score can be used in combination with the IR score and the quality score when generating scores to rank the image search results. An example relevance feedback score is a score derived from a click-through rate of an image in a search result.

The instruction engine 118 sends instructions 122 to a user device 106 in response to receiving an image search query 114 from the image search device. The instructions 122 cause the user device 106 to display a user interface that includes the image search results responsive to a query 114 from the user device 106, and to present one or more cross-language search options. As used herein, a "cross-language search option" is a translation of the query 114 into another language and a preview of search results responsive to the translation when the translation is used as an image search query. Cross-language search options are described in more detail below with reference to FIGS. 2A and 2B.

The translations of the query can be exact translations or approximate translations. An exact translation of query terms in a first language is the corresponding term(s) in a second language that are the definitional equivalent to the terms in the first language. An approximate translation of query terms in a first language is the corresponding term(s) in a second language that are semantically similar to the query terms in the first language, but are not otherwise the definitional equivalent to the terms in the first language. As will be described below, semantic similarity of terms in different languages can be derived from similar search results, selections, and other signals. The translated queries are generated by the translation engine 120.

The user devices 106 receive the instructions 122, e.g., in the form of one or more web pages, and present the user interface to users. In response to the user selecting a link in a search result at a user device 106, the user device 106 requests the resource identified by the link. The web site 104 hosting the resource receives the request for the resource from the user device 106 and provides the resource to the requesting user device 106.

Image search queries 114, and other search queries, submitted during user sessions can be stored in a data store such as the historical data store 124. Selection data specifying user actions taken after search results are provided are also stored in a data store such as the historical data store 124. These actions can include whether a search result was selected. The data stored in the historical data store 124 can be used to map search queries submitted during search sessions to resources that were identified in search results and actions taken by users.

§2.0 Example Image Search Interfaces

Figure 2A:
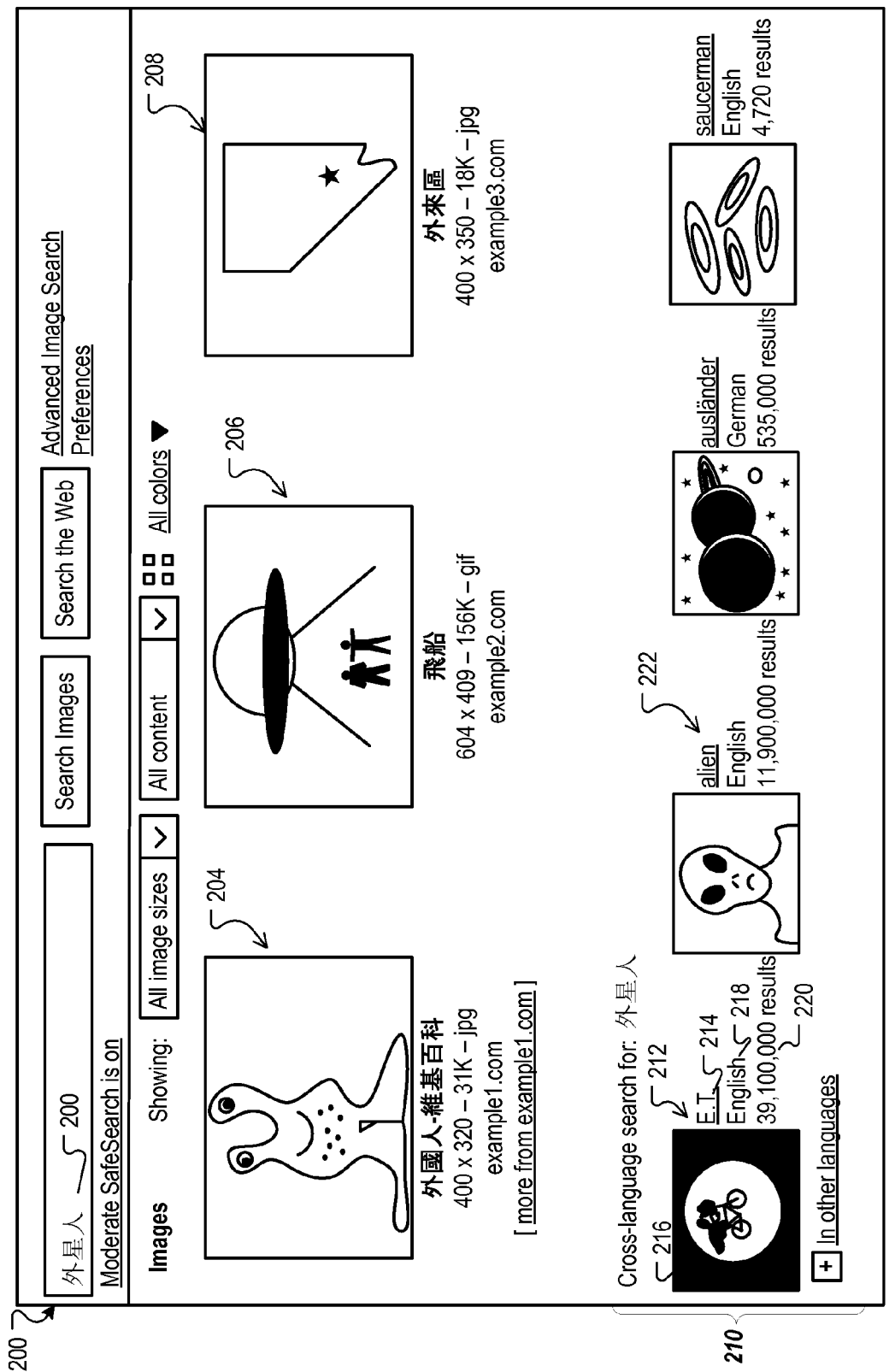
FIG. 2A illustrates an example search user interface that presents cross-language search options along with search results responsive to a query.

FIG. 2A illustrates an example search user interface 200 that presents cross-language search options along with search results responsive to a query. The text of the user interface 200 is shown in English for convenience; however, the text of the user interface can alternatively be in the language of the user submitting the query.

The image search user interface 200 presents three image search results 204, 206, and 208, responsive to the user query "外星人" 202, meaning "alien" in Chinese. In some cases, the user is satisfied with the image search results 204, 206, and 208. However, the user may also be disappointed with the search results 204, 206, and 208, for example, because the user wanted more search results, or because the user wanted different search results. For example, if the user was really interested in image search results relevant to the movie "E.T.: The Extra-Terrestrial," the image search results 204, 206, and 208 will not be what the user is interested in.

If a user is fluent in other languages, a user might re-try the search in a different language. However, users are often unfamiliar with the other languages. To help users select appropriate search queries in other languages, the user interface 200 presents several cross-language search options 210. Each cross-language search option 210 corresponds to a translation of the query 202. For example, cross-language search option 212 corresponds to the English term "E.T." Some of the cross-language search options 210 are in the same language as each other, and others are in different languages. In various other implementations, the cross-language search options 210 can all be in the same language, or can all be in different languages.

Each cross-language search option 210 includes an identification of the translation, and a preview of image search results responsive to the translation, when the translation is used as an image search query. The preview can be, for example, an image from one of the image search results responsive to the translation. The preview can alternatively or additionally be other information describing the image search results responsive to the translation. For example, cross-language search result 212 includes the approximate translation 214 "E.T.," and an image 216 from an image search result responsive to the translation. The cross-language search result 212 also includes an identification of the language of the translation, "English" 218, and the estimated, or actual, number 220 of image search results responsive to the translation.

A user can select one of the cross-language search options 210, e.g., by clicking the search option with a mouse or keyboard, or selecting the search option with another input device. In response to the selection, the user is presented with a new user interface that includes search results responsive to the translation corresponding to the selected cross-language search option. The cross-language search options 210 thus allow a user to expand his or her searches to other languages. The image preview provides the user with a visual representation of the search results responsive to the translation. This allows the user to understand what types of images will be presented for a translation, even if the user is not familiar with the language of the translation.

While the cross-language search options 210 are shown below the search results 204, 206, and 208 responsive to the query 202, the cross-language search options 210 can appear in other locations in the user interface 200, including, but not limited to, above the search results, to the left of the search results, to the right of the search results, or intermixed with the search results.

Figure 2B:
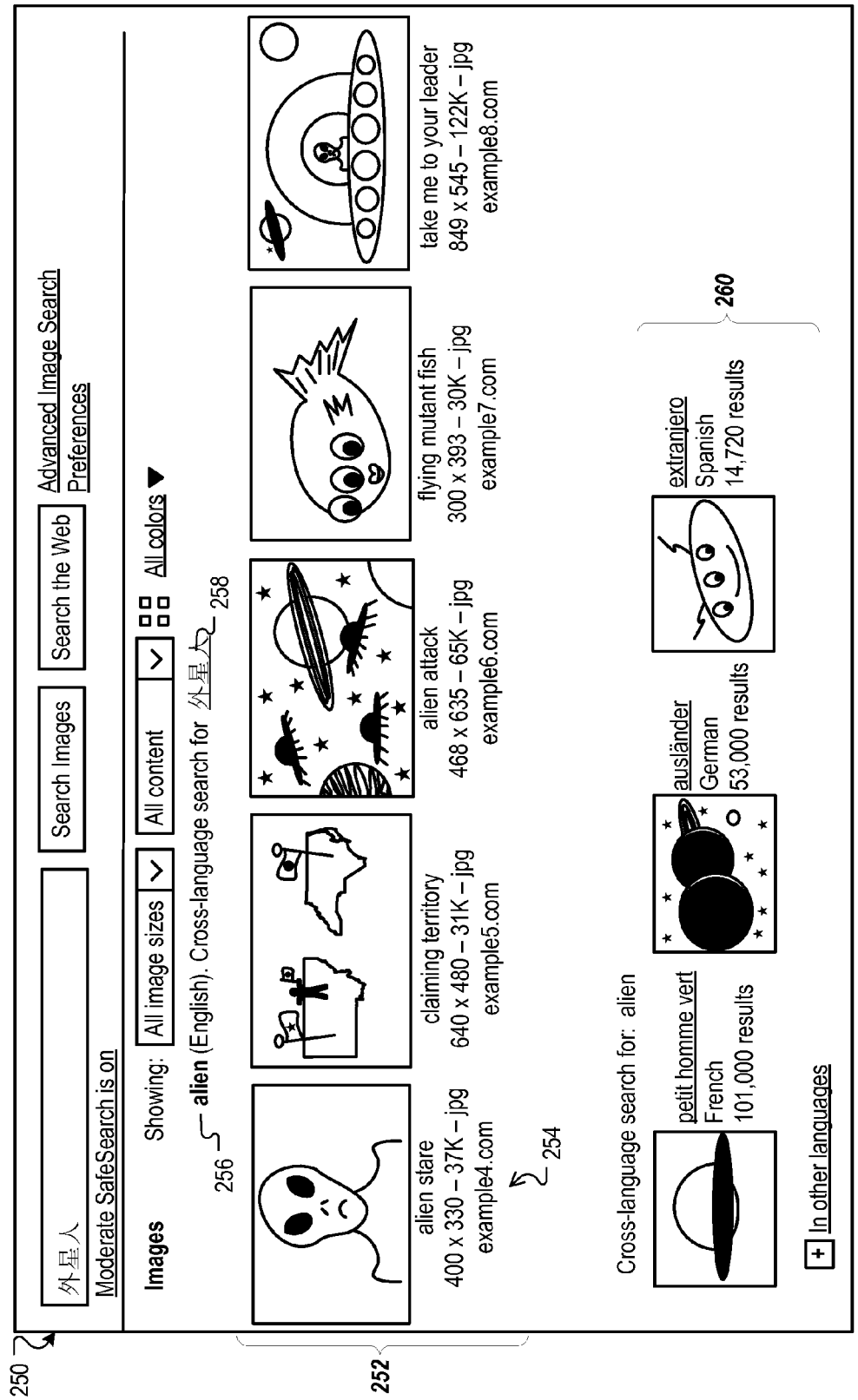
FIG. 2B illustrates an example image search interface that presents image search results responsive to a translation of the query.

FIG. 2B illustrates an example image search interface 250 presenting image search results 252 responsive to the search query "alien." The user interface 250 is presented to a user after the user selects the cross-language search option 222 corresponding to the translation "alien" in FIG. 2A.

The user interface 250 includes image search results 252 responsive to a query for "alien." These image search results 252 include image search result 254. The image of image search result 254 was the preview image for the cross-language search option 222 shown in FIG. 2A. The image search results 252 are different from the image search results 204, 206, and 208 shown in FIG. 2A. The search results 252 are different because they were identified by a search engine as being responsive to the phrase "alien," as opposed to "外星人." Therefore, the user has been provided with different image search results through the cross-language search option 222.

In addition to the image search results 252, the user interface 250 also includes an identification 256 of the translation, "alien," and an identification of the user's original query 258, "外星人." The user can select the original query 258. If the user does so, the user will be returned to the user interface 200 shown in FIG. 2A.

The user interface 250 also includes cross-language search options 260. The cross-language search options 260 are cross-language search options for the translation "alien." However, in other implementations, cross-language search options for the original query "外星人" can alternatively, or additionally, be shown.

§3.0 Example Architecture of Image Search System

Figure 3:
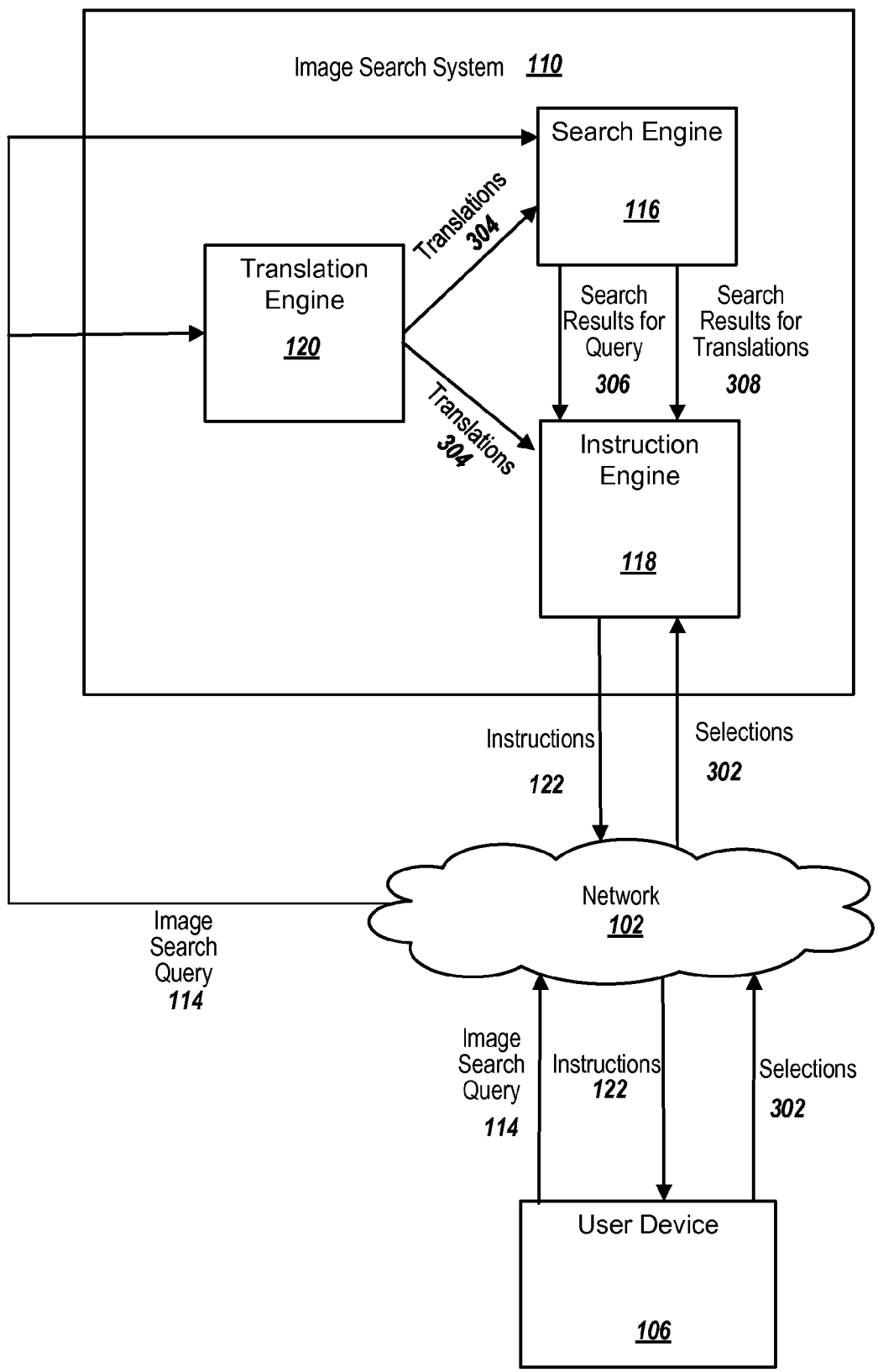
FIG. 3 is a block diagram illustrating an example architecture of an image search system.

FIG. 3 is a block diagram illustrating an example architecture of the image search system 110. The image search system 110 receives an image search query 114 from a user device 106 through a network 102, and in response to the search query 114 sends instructions 122 to the user device 106. The instructions cause the user device 106 to present the user interface described above with reference to FIG. 2A. The search system 110 can also receive selections 302 from the user device 106. In response to these selections 302 the search system 110 sends additional instructions 122 to the user device 106 to cause the user interface to present additional user interfaces, for example, the user interfaces described above with reference to FIGS. 2A and 2B.

The image search system 110 includes a translation engine 120, a search engine 116, and an instruction engine 118.

The translation engine 120 receives the image search query 114 and generates one or more translations 304 of the image search query 114. Each translation 304 is in a language different from the language of the image search query 114; however, multiple translations 304 can be provided in the same language. These translations 304 are provided to the search engine 116 and the instruction engine 118. The translation engine is described in more detail below, with reference to FIG. 4.

The search engine 116 receives the image search query 114 and the translations 304. The search engine 116 identifies image search results 306 responsive to the image search query 114, and image search results 308 responsive to each of the translations 304, for example, as described above with reference to FIG. 1. In some implementations, the search engine 116 ranks search results differently, or searches a different index of resources, based on a language associated with the user who submitted the image search query 114. The language can be associated with the user, for example, according to one or more user-specified preferences, or according to a geographic location of the user. Alternatively, the search engine 116 can associate the language of each translation with the user when identifying image search results responsive to the translation.

The instruction engine 118 receives the translations 304, the search results 306 for the image search query, and the search results 308 for the translations, and generates instructions to send to the user device 106. The instruction engine 118 can generate instructions to cause the user device to present various user interfaces.

For example, the instruction engine 118 can generate instructions, that when executed by the user device 106, cause the user device 106 to present a user interface including the search results 306 responsive to the image search query 114, as well as a cross-language search option corresponding to each of the translations 304. An example of this user interface is described above, with reference to FIG. 2A. The cross-language search option for a translation includes the translation and a preview of the image search results 308 responsive to the translation. In some implementations, the preview is an image corresponding to one of the image search results 308 for the translation. The instruction engine 118 can select the image, for example, by selecting the image corresponding to the highest-ranked image search result, by selecting the image corresponding to a randomly selected image search result in a top number of search results, or by selecting the image whose corresponding image search result is most frequently selected by users, e.g., as indicated by historical data such as the historical data in the historical data store 124 described above with reference to FIG. 1.

In response to a user selecting one of the cross-language search options, the instruction engine 118 generates instructions that, when executed by the user device 106, cause the user device 106 to present a user interface including the search results 308 responsive to the translation corresponding to the selected cross-language search option. An example of this user interface is described above, with reference to FIG. 2B.

Once the user device presents the user interface including the search results 308 responsive to the translation corresponding to the selected cross-language search option, the user can select the original query in the user interface. In response to this selection, the instruction engine 118 generates instructions that, when executed by the user device 106, cause the user device 106 to once again present a user interface including the search results 306 responsive to the search query 114, as well as the cross-language search options corresponding to the translations 304.

§3.1 Example Translation Engine

Figure 4:
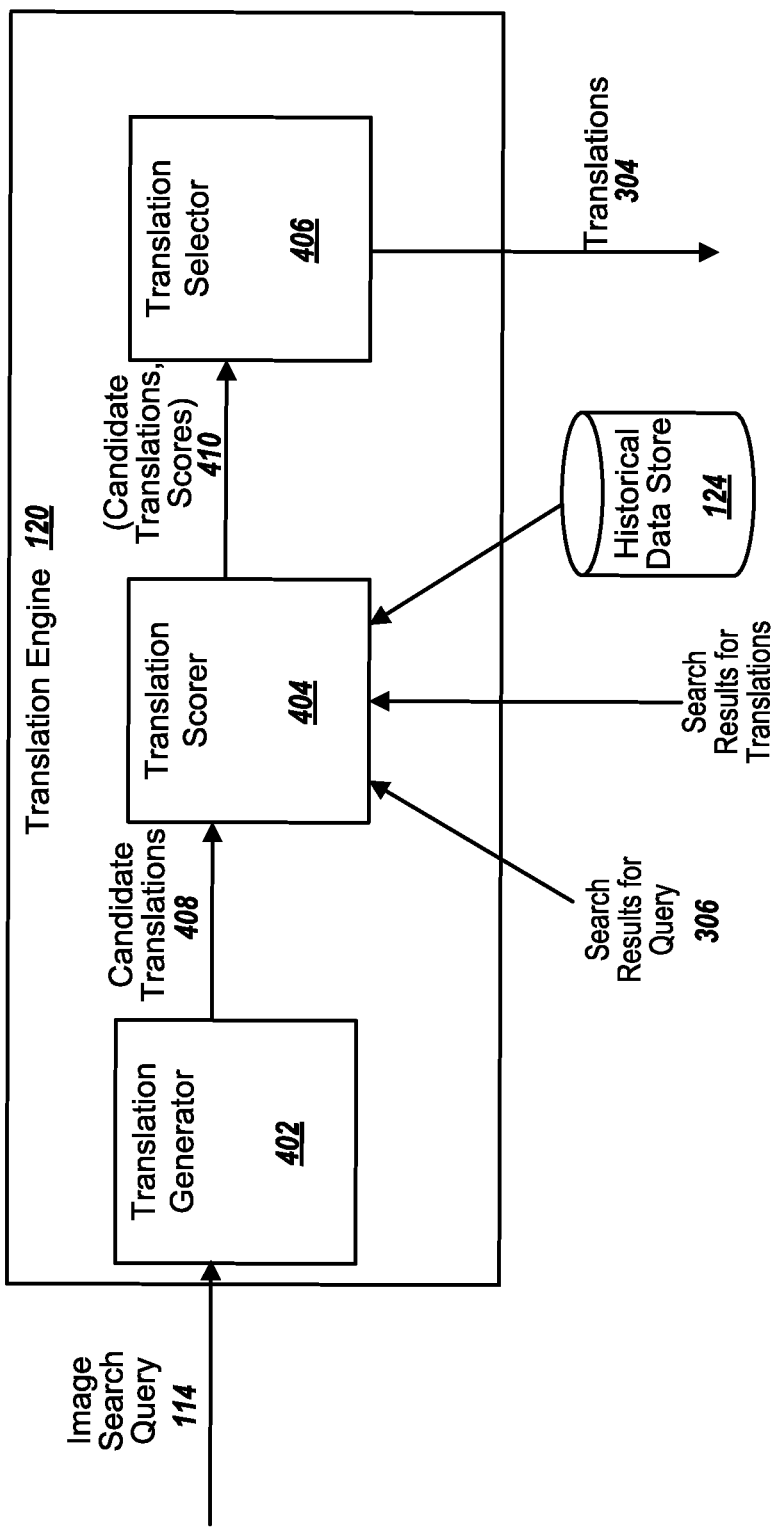
FIG. 4 is a block diagram illustrating an example translation engine.

FIG. 4 is a block diagram illustrating an example translation engine 120. The translation engine 120 receives an image search query 114 and generates one or more translations 304 of the image search query. The example translation engine 120 includes a translation generator 402, a translation scorer 404, and a translation selector 406.

The translation generator 402 processes the image search query 114 to generate one or more candidate translations 408. As described above, the candidate translations 408 can include exact translations and approximate translations. The translation generator can generate the exact translations 408, for example, using conventional techniques, for example, by retrieving translations for the terms of the query from a dictionary that associates terms with their translations, or by using various machine translation techniques. The system can generate approximate translations in various ways. For example, the approximate translations can be retrieved from a database that associates words with their approximate translations. The approximate translations can be derived from similar search results, selections, and other signals. For example, if two queries have similar responsive search results, or if users select similar search results responsive to the two queries, then the terms of one query can be associated with the terms of the other query as an approximate translation, and vice versa. The search results can be similar if there is a statistically significant overlap in the search results. Search results selected by users can be determined to be similar if there is a statistically significant overlap between the groups of selected search results.

The translation scorer 404 receives the candidate translations 408 and generates a score for each of the candidate translations. The score can be based on one or more factors including, but not limited to, measurements of the candidate translation 408 as a query, measurements of the search results responsive to the candidate translation 408 as a query, and language promotion measurements.

Measurements of the candidate translation 408 as a query include, but are not limited to, a click-through-rate for the candidate translation 408, a unique users measurement for the candidate translation 408, and a frequency of submission measurement for the candidate translation 408. The click-through-rate for the candidate translation 408 is the number of times users select one or more search results in response to a query divided by the total number of times users submit the query.

The unique users measurement estimates the number of unique users who submit the candidate translation as a query and/or the number of unique user devices used to submit the query. The translation scorer 404 can estimate the number of unique users who submitted the candidate translation using various techniques, for example, by counting the number of unique Internet Protocol (IP) addresses from which the query was submitted, or by counting a number of cookies assigned by a search engine to users who submitted the query. In some implementations, the data used to identify the number of unique users is anonymized for privacy protection. For example, each user can be identified by an Internet protocol (IP) address of a corresponding user device, or can be identified according to a unique random number that is associated with the IP address of the user device. The cookie data can be similarly anonymized. Thus, the user data is not associated with and does not identify a particular user. Other anonymization processes, such as hashing, encryption and obfuscation techniques, can also be used to ensure that user privacy is protected.

The frequency of submission measurement represents how often the candidate translation 408 is received from a user as a search query, or alternatively as an image search query. The frequency of submission measurement can be determined, for example, by analyzing data in the historical data store 124. For example, if the historical data store includes what search queries, or image search queries, users have submitted, the frequency of submission measurement can be determined by counting the number of times a query for the candidate translation 408 occurs in the data. In some implementations, the frequency of submission measurement is determined by dividing that count by the total number of queries users submitted.

In some implementations, the frequency of submission measurement has one value when the query is a long-tailed query, and a different value when the query is not a long-tailed query. The translation scorer can determine whether a query is a long-tailed query according to various metrics. For example, in some implementations, a query is a long-tailed query when it is submitted with a frequency that is less than a threshold. In other implementations, a query is a long-tailed query when the unique users measurement for the query is below a threshold. In other implementations, a query is a long-tailed query when the temporal or geographic standard deviation of the number of times the query is submitted is below a threshold, e.g., when the query was primarily submitted during a short period of time or by users in a small geographic region.

Measurements of the search results responsive to the candidate translation 408 as a query include, but are not limited to, a quantity of results measurement and/or a visual similarity measurement. The quantity of results measurement is the number of search results responsive to the candidate translation 408, when the candidate translation 408 is used as an image search query. The visual similarity measurement is an estimate of visual similarity between a group of search results responsive to the image search query 114 and a group of search results responsive to the candidate translation 408 when the candidate translation is used as an image search query.

Language promotion measurements estimate interrelatedness between the language of the image search query 114 and the language of the candidate translation 408. For example, a language promotion measurement can be a frequency of revision measurement. The frequency of revision measurement measures how often search queries issued in the language of the image search query 114 are revised to corresponding search queries in the language of the candidate translation 408. A given search query in the language of the image search query 114 is considered to have been revised to a corresponding search query in the language of the candidate translation 408 when a user submits the given search query and then submits the corresponding search query. The corresponding search query is an exact translation, or an approximate translation, of the given search query. For example, if the language of the image search query 114 is English and the language of the candidate translation 408 is French, when a user submits a search for "Eiffel Tower" and then submits a search for "De Toren Van Eiffel," the translation scorer 404 can consider "De Toren Van Eiffel" to be a corresponding search query, because it is the French translation of the English phrase "Eiffel Tower."

The translation scorer 404 can determine the frequency of revision measurement for the languages of the image search query 114 and a candidate translation 408, for example, from an analysis of the data in the historical data store 124. The corresponding search query can be an exact translation, e.g., as determined according to conventional translation techniques. The corresponding search query can alternatively be an approximate translation, e.g., a translation that differs in the use of slang words or differ in the use of articles such as "a" or "the." The corresponding search query can be submitted immediately following the given search query, or can be submitted within a pre-determined window such as a pre-determined number of queries or a pre-determined amount of time. The window can be determined, for example, empirically.

In general, a high frequency of revision measurement indicates overlap in searches between the language of the image search query 114 and the candidate translation 408, and therefore is an indication that the candidate translation 408 should be presented to a user.

Once the translation scorer 404 identifies the factors, the translation scorer 404 uses the factors to generate a score, for example, by taking a weighted sum, or weighted average, of the factors. The weights for a weighted sum or average can be determined, for example, empirically. In some implementations the translation scorer 404 normalizes the factors before they are combined.

The translation selector 406 receives the candidate translations 408 and their scores 410 from the translation scorer 404, and selects one or more of the candidate translations 408. The selected translations are then output as the translations 304 of the image search query 114. The translation selector 406 selects the translations 304 from the candidate translations 408 according to the scores for the candidate translations 408. For example, the translation selector 406 can select a top number of candidate translations 408 ranked in order of score, or can select all candidate translations 408 having a score that satisfies a threshold. The number and the threshold can be determined, for example, empirically.

While the above description focuses on a translation engine where candidate translations 408 are generated, and then translations 304 are selected from the candidate translations 408, in other implementations, the translation engine 120 can also use different selection methods, or alternatively can select all translations that are generated.

§4.0 Example Image Search User Interface Generation Process

Figure 5:
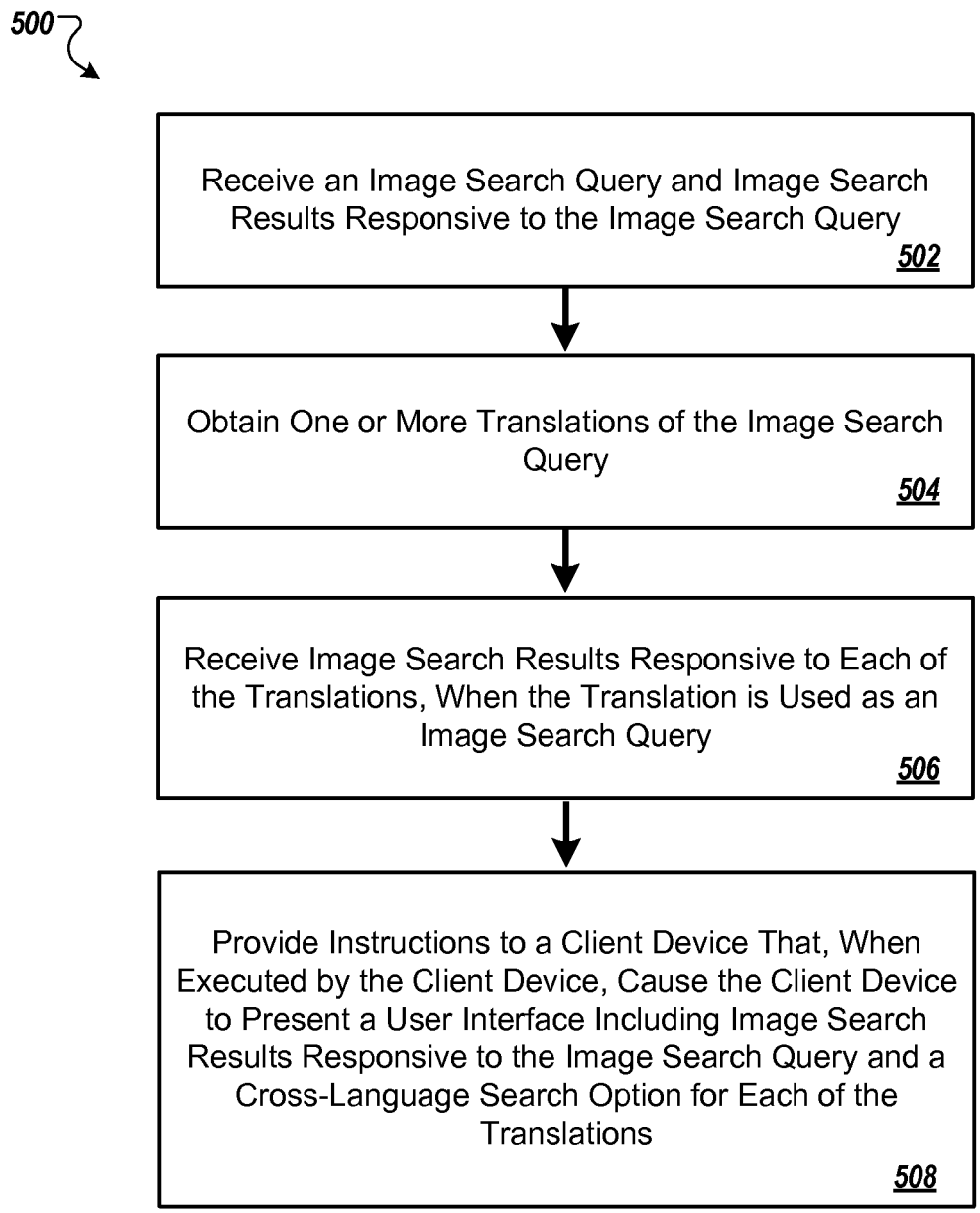
FIG. 5 is a flow diagram of an example image search user interface generation process.

FIG. 5 is a flow diagram of an example image search user interface generation process 500. The process 500 is used to generate instructions that cause a client device to present a user interface including image search results responsive to a query, and cross-language search options corresponding to the query. The process 500 can be implemented, for example, by the image search system 110.

The process 500 receives an image search query and image search results responsive to the image search query (502). The image search query can be received from a user device, for example, as described above with reference to FIG. 3. The image search results can be received, for example, from a search engine, as described above with reference to FIG. 3. The process 500 then obtains one or more translations of the image search query (504), for example, as described above with reference to FIGS. 3 and 4. The process 500 then receives image search results responsive to each of the translations of the image search query, when each translation is used as an image search query (506), for example, as described above with reference to FIG. 3. The system then provides instructions to a client device (508). When the instructions are executed by the client device, they cause the client device to present a user interface including image search results responsive to the image search query, and a respective cross-language search option for each of the translations. Each cross-language search option is selectable in the user interface. This step is described in more detail above with reference to FIG. 3.

In some implementations, the process 500 further provides additional instructions to the client device in response to a selection of one of the cross-language search options. These instructions cause the client device to present a second user interface including the translation of selected cross-language search option, and image search results responsive to the translation. An example of this user interface is described above, with reference to FIG. 2B. The process 500 can further provide still additional instructions to the client device in response to selection of the original image search query in the second user interface. These instructions cause the client device to present a user interface including the image search results responsive to the original image search query.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. As another example, while the description above focuses on image search, similar techniques could be used to present cross-language search options in response to other types of queries.

What is claimed is:

1. A computer-implemented method, comprising:
receiving, at a data processing apparatus, a first image search query and first image search results that are responsive to the first image search query, the first image search query being one or more terms in a first language;
obtaining, by the data processing apparatus, translations of the first image search query, wherein each translation is a translation of the first image search query into a respective second language different from the first language;
receiving, at the data processing apparatus, for each translation of the first image search query, respective image search results that are determined to be responsive to the translation of the first image search query when the translation is used as an image search query;
providing first instructions to a client device that, when executed by the client device, cause the client device to present a user interface including:
one or more of the first image search results responsive to the first image search query; and
a respective cross-language search option for each of the translations of the first image search query, the respective cross-language search option for each translation including the translation and a preview of the respective image search results responsive to the translation, wherein each cross-language search result is selectable in the user interface, and wherein the preview of the respective image search results responsive to the translation is an image that is most frequently selected by users in response to submitting the translation as an image search query.

2. The method of claim 1, further comprising, in response to a selection of a first cross-language search result, providing second instructions to the client device that, when executed by the client device, cause the client device to present a user interface including a first translation corresponding to the first cross-language search result and the respective image search results that are responsive to the first translation.

3. The method of claim 2, wherein:
the second instructions further include instructions that, when executed by the client device, cause the client device to present the first image search query;
the first image search query is selectable in the user interface; and
in response to a selection of the first image search query, providing third instructions to the client device that, when executed by the client device, cause the client device to present a user interface including the first image search results.

4. The method of claim 1, wherein obtaining one or more selected translations for the first image search query comprises:
receiving a plurality of candidate translations of the first image search query;
determining a score for each candidate translation; and
selecting the translations from the candidate translations according to the scores.

5. The method of claim 4, wherein determining a score for a candidate translation comprises determining the score for the candidate translation from a frequency of submission measurement that measures how often the candidate translation is received from users as an image search query.

6. The method of claim 4, wherein determining a score for a candidate translation comprises determining the score for the candidate translation from a frequency of revision measurement that measures how often search queries in the first language are revised by users to corresponding search queries in the respective second language of the candidate translation.

7. The method of claim 4, wherein determining a score for a candidate translation comprises determining the score for the candidate translation from a click through rate for the candidate translation when the candidate translation is submitted as a search query, wherein the click through rate measures how often users select search results responsive to the candidate translation.

8. The method of claim 4, wherein determining a score for a candidate translation comprises determining the score for the candidate translation from a unique users measurement that estimates a number of unique users that submitted the candidate translation as a search query.

9. The method of claim 4, wherein determining a score for a candidate translation comprises determining the score for the candidate translation from a quantity of results measurement that measures a number of image search results responsive to the candidate translation, when the candidate translation is submitted as an image search query.

10. A system, comprising:
a processor; and a computer storage medium coupled to the processor and including instructions, which, when executed by the processor, causes the processor to perform operations comprising:

receiving a first image search query and first image search results that are responsive to the first image search query, the first image search query being one or more terms in a first language;

obtaining translations of the first image search query, wherein each translation is a translation of the first image search query into a respective second language different from the first language;

receiving for each translation of the first image search query, respective image search results that are determined to be responsive to the translation of the first image search query when the translation is used as an image search query;

providing first instructions to a client device that, when executed by the client device, cause the client device to present a user interface including:

one or more of the first image search results responsive to the first image search query; and a respective cross-language search option for each of the translations of the first image search query, the respective cross-language search option for each translation including the translation and a preview of the respective image search results responsive to the translation, wherein each cross-language search result is selectable in the user interface, and wherein the preview of the respective image search results responsive to the translation is an image that is most frequently selected by users in response to submitting the translation as an image search query.

11. The system of claim 10, further operable to perform operations comprising, in response to a selection of a first cross-language search result, providing second instructions to the client device that, when executed by the client device, cause the client device to present a user interface including a first translation corresponding to the first cross-language search result and the respective image search results that are responsive to the first translation.

12. The system of claim 11, wherein:

the second instructions further include instructions that, when executed by the client device, cause the client device to present the first image search query;

the first image search query is selectable in the user interface; and in response to a selection of the first image search query, providing third instructions to the client device that, when executed by the client device, cause the client device to present a user interface including the first image search results.

13. The system of claim 10, wherein obtaining one or more selected translations for the first image search query comprises:

receiving a plurality of candidate translations of the first image search query;

determining a score for each candidate translation; and selecting the translations from the candidate translations according to the scores.

14. The system of claim 13, wherein determining a score for a candidate translation comprises determining the score for the candidate translation from a frequency of submission measurement that measures how often the candidate translation is received from users as an image search query.

15. The system of claim 13, wherein determining a score for a candidate translation comprises determining the score for the candidate translation from a frequency of revision measurement that measures how often search queries in the first language are revised by users to corresponding search queries in the respective second language of the candidate translation.

16. The system of claim 13, wherein determining a score for a candidate translation comprises determining the score for the candidate translation from a click through rate for the candidate translation when the candidate translation is submitted as a search query, wherein the click through rate measures how often users select search results responsive to the candidate translation.

17. The system of claim 13, wherein determining a score for a candidate translation comprises determining the score for the candidate translation from a unique users measurement that estimates a number of unique users that submitted the candidate translation as a search query.

18. The system of claim 13, wherein determining a score for a candidate translation comprises determining the score for the candidate translation from a quantity of results measurement that measures a number of image search results responsive to the candidate translation, when the candidate translation is submitted as an image search query.

19. A computer-storage medium encoded with a computer program, the computer program comprising instructions operable to cause data processing apparatus to perform operations comprising:

receiving a first image search query and first image search results that are responsive to the first image search query, the first image search query being one or more terms in a first language;

obtaining translations of the first image search query, wherein each translation is a translation of the first image search query into a respective second language different from the first language;

receiving for each translation of the first image search query, respective image search results that are determined to be responsive to the translation of the first image search query when the translation is used as an image search query;

providing first instructions to a client device that, when executed by the client device, cause the client device to present a user interface including:

one or more of the first image search results responsive to the first image search query; and a respective cross-language search option for each of the translations of the first image search query, the respective cross-language search option for each translation including the translation and a preview of the respective image search results responsive to the translation, wherein each cross-language search result is selectable in the user interface, and wherein the preview of the respective image search results responsive to the translation is an image that is most frequently selected by users in response to submitting the translation as an image search query.

* * * * *